United States Patent [19]

Yang

[11] Patent Number: 4,645,980
[45] Date of Patent: Feb. 24, 1987

[54] LIGHTING SYSTEM HAVING PHOTOSENSING TIMING SWITCH CIRCUIT

[76] Inventor: Tai-Her Yang, 5-1 Tay Pyng St., Shi Hwu Jenn, Jang Huah Shiann, Taiwan

[21] Appl. No.: 406,982

[22] Filed: Aug. 10, 1982

[51] Int. Cl.$^4$ ............................................. H05B 37/02
[52] U.S. Cl. .................... 315/159; 315/129; 315/360
[58] Field of Search ............... 315/159, 360, 129, 316; 250/214 AL; 307/141.4

[56] References Cited

U.S. PATENT DOCUMENTS

| | | | |
|---|---|---|---|
| 3,184,637 | 5/1965 | Skinner | 315/129 |
| 4,281,365 | 7/1981 | Elving et al. | 362/20 |
| 4,283,661 | 8/1981 | Doty | 315/129 X |
| 4,354,120 | 10/1982 | Schornack | 315/360 X |
| 4,362,970 | 12/1982 | Grady | 315/129 |
| 4,388,567 | 6/1983 | Yamazaki et al. | 315/316 X |
| 4,451,763 | 5/1984 | Sodini | 315/159 |

FOREIGN PATENT DOCUMENTS 2757373 6/1978 Fed. Rep. of Germany ...... 315/159

OTHER PUBLICATIONS

B. E. Kerley, "Garden Path Lighting".
R. A. Penfold, "Dusk to Dawn Switch", Radio and Electronics Constructor, vol. 33, No. 10, Jun. 1980, Great Britain.

Primary Examiner—David K. Moore
Attorney, Agent, or Firm—Leonard Bloom

[57] ABSTRACT

A lighting system, which includes one or more lighting apparatus sets, includes a control circuit. The control circuit has an ambient light sensing component and processing circuitry which produce a control signal whenever the intensity of ambient light reaches a given level and remains at that level or less. A delay (debounce) circuit receives the control signal and provides an output which effects the transfer of power to the lighting apparatus set or sets and starts a timing circuit which is operatively arranged to assure continuing transfer of power to the set or sets for a given time interval, at the expiration of which power is removed from the set or sets. An alarm circuit also controlled by an output from the timing circuit may provide a warning alarm shortly before the expiration of the ON time interval. The control circuit may also turn OFF the power to the set or sets when ambient light of a set intensity becomes present.

2 Claims, 46 Drawing Figures

FIG. 6-A

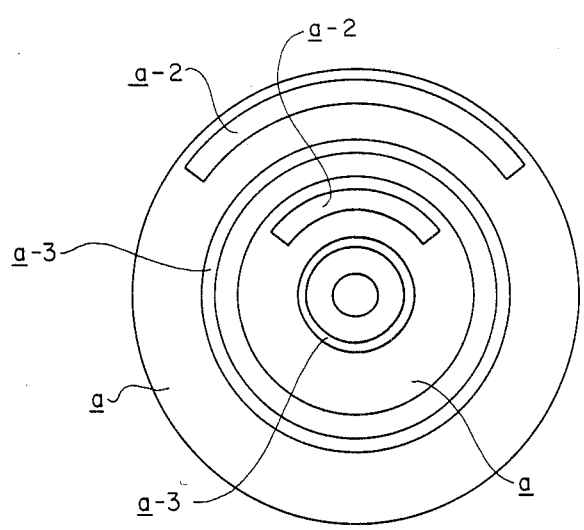
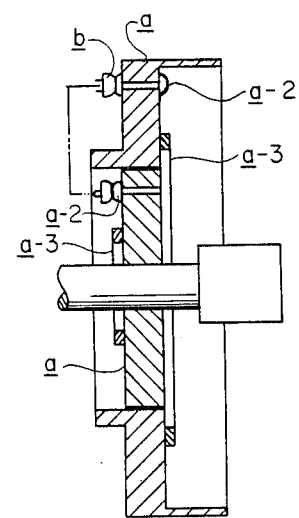
FIG. 10-11    FIG. 10-12
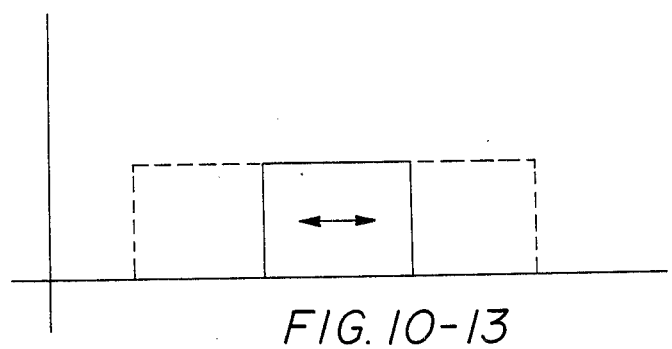
FIG. 10-13

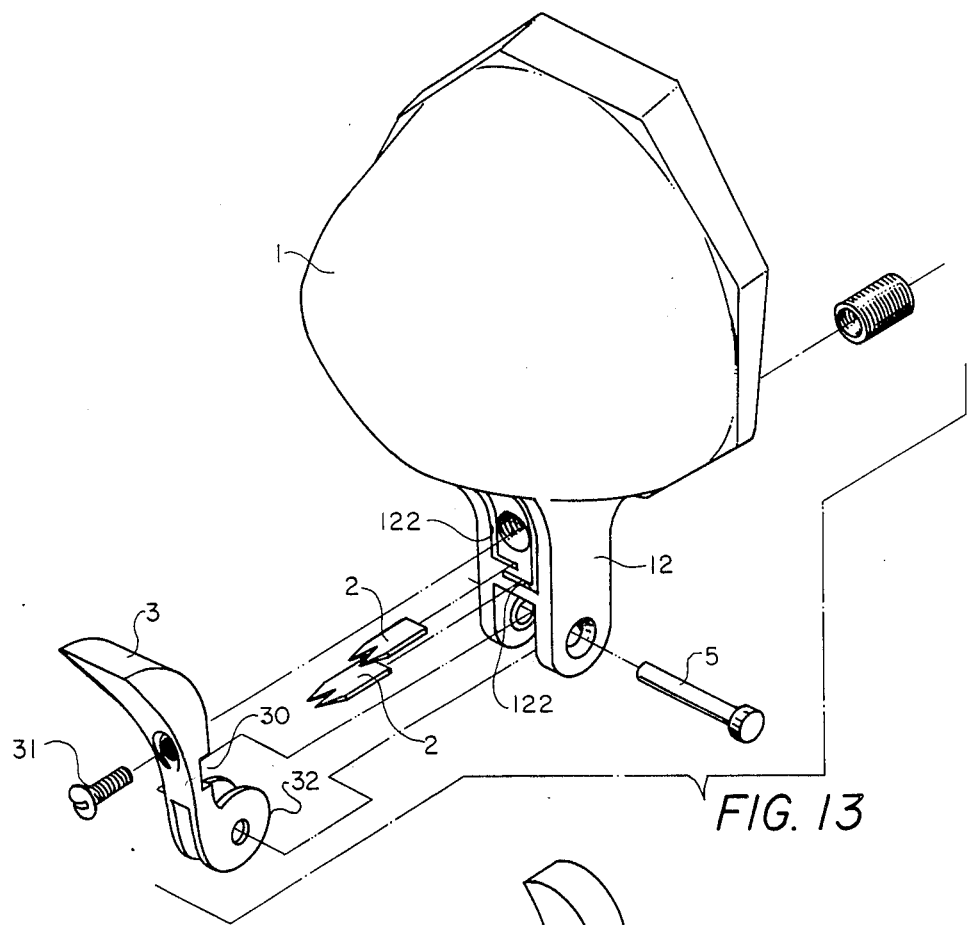
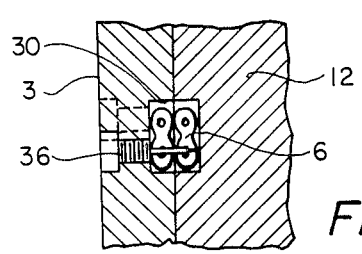
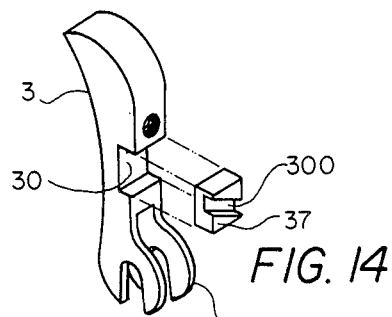
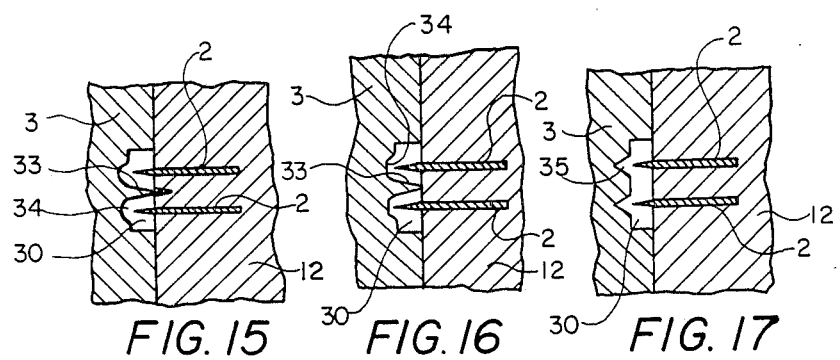
FIG. 13
FIG. 14
FIG. 18
FIG. 15  FIG. 16  FIG. 17

LIGHTING SYSTEM HAVING PHOTOSENSING TIMING SWITCH CIRCUIT

BACKGROUND OF THE INVENTION

This invention relates to the structural design of cord-holding down and power linkup structure to at least one lamp in a lighting system. The invention also relates to a lighting system which includes a photosensing device and a timing switch circuit for indoor and outdoor areas, such as general garden and court yard areas.

The invention is especially concerned with a lighting apparatus set composed of a lamp shell seat, a power linkup insertion plate, a cord holding down seat and an anchoring rod. By rotation of a bolting rod or other mechanical element coupled with this insertion rod, the relative coupling angle between the integral lamp shell seat and the insertion rod can be adjusted.

Thus, the aforesaid lighting apparatus which includes the photosensing device can be readily controlled. It consists of the photo detection circuit composed of a D.C. source (battery), a photo sensitive resistor, a transistor and a timing control device composed of a mechanical, or an electromechanical device, or an electronic circuit, or a microcomputer, thus forming a photosensing timing switch circuit by transforming the surrounding light source intensity into reference signals. Its advantage lies in the fact that such an arrangement can avoid unnecessary lighting up the lamps throughout the night. Thus, one saves electric energy. Due to using surrounding ambient light intensity as the reference signals, it can automatically switch on or off the load on time regardless of the change of the seasons concerned. Therefore, it has a flexibility higher than the common power linkup type which is set by a conventional 24-hour continuous operation timer and it can automatically adapt itself to the change of seasons to light up the lamps on time and is also free of the accumulated errors over the extended period of time of usage in addition to eliminating the defect usually observed on the on-off way of the traditional timing switch device to the effect that such a device is only capable of continuously conducting a power linkup without interruption and cannot be set a certain period of time as the time of power linkup according to the actual needs.

BRIEF DESCRIPTION OF THE DRAWINGS

FIG. 4-1 is a schematic, partially block, diagram of a further embodiment of a circuit in accordance with the present invention.

FIG. 6A is a circuit diagram of the practical example of a preset time limit cut-off, having a photosensitive starting feature in accordance with the present invention.

FIG. 6B is a circuit diagram of the alarm circuit which functions before the preset limit cut-off in accordance with the present invention.

FIG. 10-1 is a schematic diagram of a step switch in a circuit which may be used in practicing the present invention.

FIGS. 10-2 and 10-3 illustrate the functions of the step switch of FIG. 10-1.

FIG. 10-4 shows the structure of a step switch which may have one-stage or multi-stages for adjustment and can be used in practicing the present invention.

FIGS. 10-5 and 10-6 show the cut-off function of the step switch to a load upon its moving to the contact points at the last stage.

FIGS. 10-7 and 10-8 show the cut-off function of the step switch to a load during its early moving stage on the contact points.

FIGS. 10-9 and 10-10 illustrate the resulting function of a step switch, in which the stepping space between the contact points is shorter than the span between the contact points.

FIGS. 10-11 thru 10-13 show the function of an embodiment of two sets of co-axial disks during rotation.

FIG. 10-14 shows an embodiment of the step switch having dual-end contact points.

FIG. 10-15 shows an embodiment of a setting disk furnished with contact points and conductive strip.

FIG. 11 is a structural view, partially in section, of the component profile of an embodiment of a lighting apparatus set which may be used in practicing the present invention.

FIG. 12 is a pictorial view of a practical example of an insertion rod which can be used in practicing the present invention.

FIG. 13 is a pictorial, exploded view of the lighting apparatus set of FIG. 11.

FIG. 14 is a pictorial view of a cord-holding seat and the auxiliary positioning seat which may be used in practicing the present invention.

FIG. 15 is an illustration, partially in section, of a first embodiment of a cord-holding seat and a power linkup insertion plate in a foot seat, which may be used in practicing the present invention.

FIG. 16 is an illustration, partially in section, of a second embodiment of a power linkup structure composed of a cord-holding seat and a power linkup plate in a foot seat, which may be used in practicing the present invention.

FIG. 17 is an illustration, partially in section, of a third embodiment of a power linkup structure composed of a cord-holding seat and a power linkup plate in a foot seat, which may be used in practicing the present invention.

FIG. 18 is an illustration, partially in section, of a fourth embodiment of a power linkup structure composed of a cord-holding seat and a power linkup plate in a foot seat, which may be used in practicing the present invention.

DETAILED DESCRIPTION OF PREFERRED EMBODIMENTS

Figure 1:
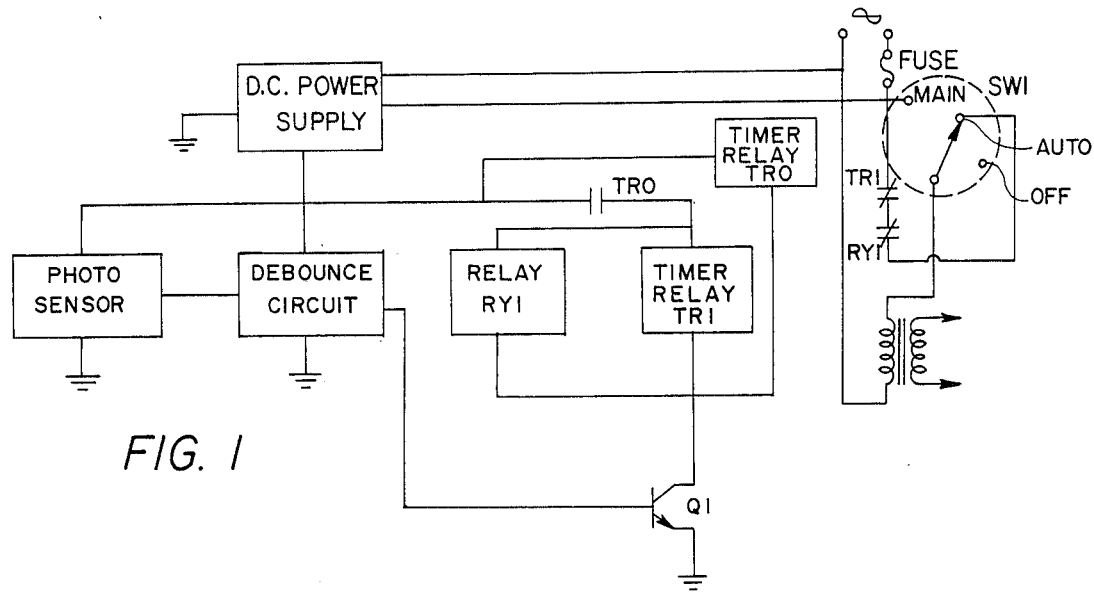
FIG. 1 is a schematic, partially block, diagram of a practical example of a turn-on photosensing timing switch circuit in accordance with the present invention.

As shown in the accompanying drawing figures, the present invention relates to a structural design of the cord-holding down and power linkup structure and photo-sensing timing switch device. As illustrated, in part, in FIGS. 11, 12, an embodiment of a lighting apparatus set, useful in practicing the present invention, is composed of a lamp shell seat 1, a power linkup insertion plate 2, a cord-holding down seat 3 and an anchoring insertion rod 4. By rotation of a bolting rod 5 or other mechanical element coupled to the insertion rod 4 it is possible to adjust the relative coupling angle between the integral lamp shell seat 1 and insertion rod 4 and, thus, to adjust the lighting apparatus set operatively associated with the photosensing device.

Briefly, the photo detection component of the system includes a source of D.C. power (battery), a photo sensitive resistor, a transistor, and a timing control device, which may be a mechanical, or a electromechanical, or an electronic device, or a microcomputer, thus forming a light responsive photosensing timing switch arrangement which uses the surrounding ambient light intensity to develop reference signals. The salient feature of the aforementioned timing control device lies in that when the ambient light intensity drops to a given level, this is confirmed by the delay (debounce) circuit to exclude response to interference of a short-term temporary light source changes. Power linkup to the lighting apparatus set is controlled by a time control device, the ON condition of the power linkup circuit is achieved only when the light intensity has dropped below the set point and remains at or below the set point for a predetermined time, thus maintaining the power linkup action to both the one or more lighting apparatus sets and to the timing circuit. The OFF condition is achieved whenever (1) The timing circuit has reached its predetermined set time to produce an action, and (2) The light intensity of the light detected by the detection component in response to the surrounding (ambient) light has increased to a predetermined value. When the above conditions (1) and (2) are present simultaneously, the circuit is kept OFF.

After the maintenance of the circuit ON there are two ways that the timing circuit accepts control. Firstly, in the photo-start functional type, after being started by the photo effect, the circuit immediately is fed electric power and transmits the power to the lighting apparatus set or sets (load or loads) until the preset time and then power is cut OFF. Secondly, in photo-start continuous timing type, after delaying a first preset time after started by the photo response, it activates the first preset action to supply power to the lighting apparatus set or sets (load or loads) and then cuts OFF the power to the set or sets until the second preset time. The timing device and the circuit linkup maintenance of this design can be a timer realized as a mechanical or electromechanical type or a microcomputer. The difference between the above-mentioned two ways and the automatic switch control circuit of conventional photoelectric controlled street lights lies in that the former can set the power linkup time according to the actual needs, the advantage being principally that unnecessary lighting up all the night is avoided, thus saving electric energy. Moreover, due to using the peripheral light intensity status as reference signals, one can automatically start to supply power to the load on time without regard to the change of seasons. Such an arrangement has a flexibility higher than the power linkup type control arrangements set by the traditional 24-hour continuous timer; it automatically meets the needs of the seasonal changes to light up the lamps on time without any accumulated time errors and even without any worry about power failure. This can also eliminate the shortcoming observed for conventional devices provided with a traditional timing switch ON-OFF feature, which can only provide continuous power linkup but cannot set a certain period of time within such a duration as a power linkup time according to the actual needs.

FIG. 1 is a schematic, partially block, diagram of the practical example of the photo-sensing timing switch circuit.

Figure 2:
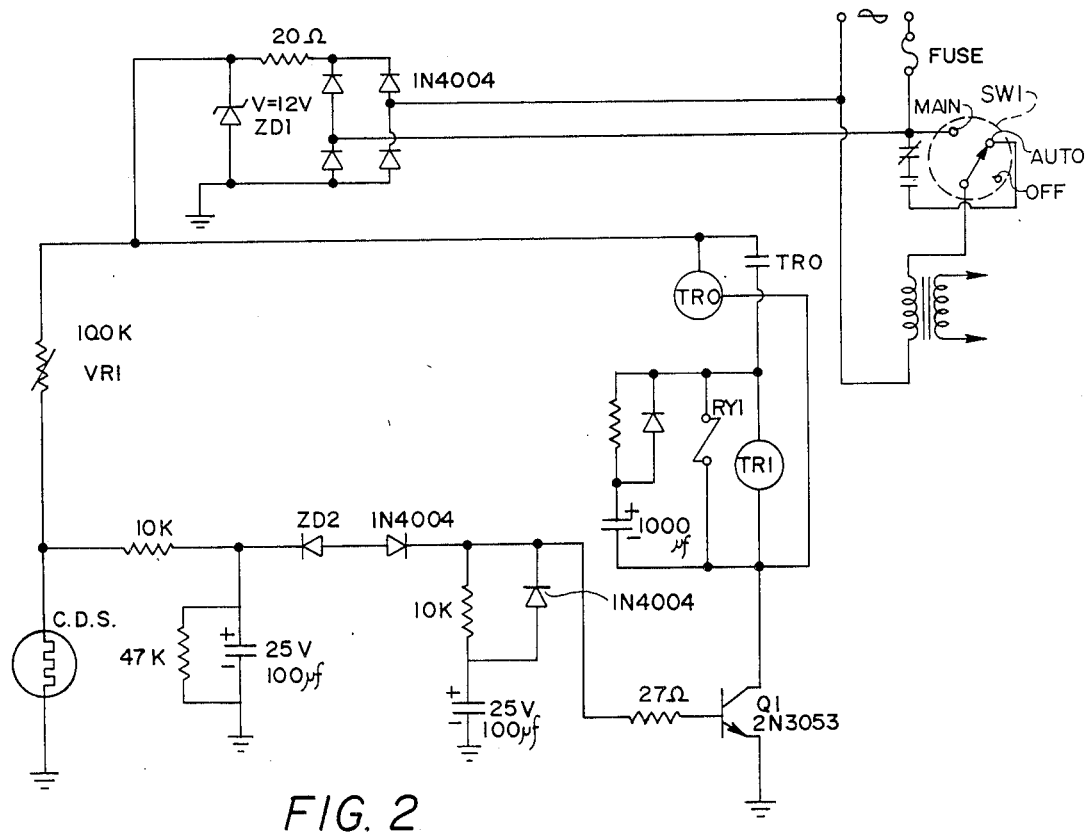
FIG. 2 is a detailed circuit diagram of the practical example of the turn-on photosensing timing switch circuit of FIG. 1.

FIG. 2 is a detailed circuit diagram of the circuit of Fig. 1 with a D.C. control power supply and a photo detection device to detect sunlight (ambient) status in the area, such as a garden or court yard, whereas when it receives no sunlight after sunset, its signals are sent to a debounce (delay) circuit to drive relay RY1 and to supply timer relay TR1 with power, in series with the normally open contacts TR1 of this timer relay and with the normally closed contacts of RY1, which after such signals are confirmed, thus supplying power to the load transformer (unnumbered) connected, in turn, to transfer power to the lighting apparatus set or sets connected in parallel via the secondary side of the transformer. When the timer relay TR1 reaches the preset time, it activates to cut off the power supply. This design can include two timer relays TR0 and TR1; TR0 being used when the sunlight is absent, it generates a set time delay before it drives RY1 and TR1 to provide power to the transformer unit. In this figure, SW1 is the manual power linkup. The circuit can be wired as shown in FIG. 2, the values and identifying numerals of its circuit components being set out on FIG. 2, enabling one skilled in the art to readily construct the circuit.

Figure 3:
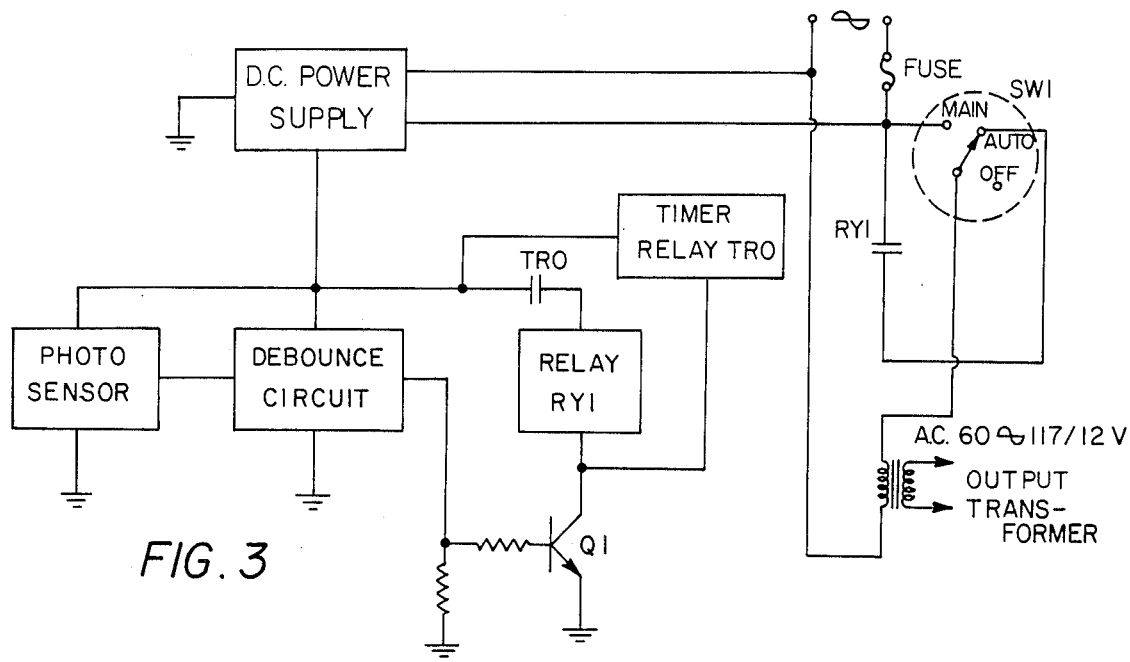
FIG. 3 is schematic, partially block, diagram of a practical example of a cut-off circuit having a preset time limit and including a light-responsive starting circuit in accordance with the invention.

FIG. 3 is a practical example concerning light responsive starting.

Figure 4:
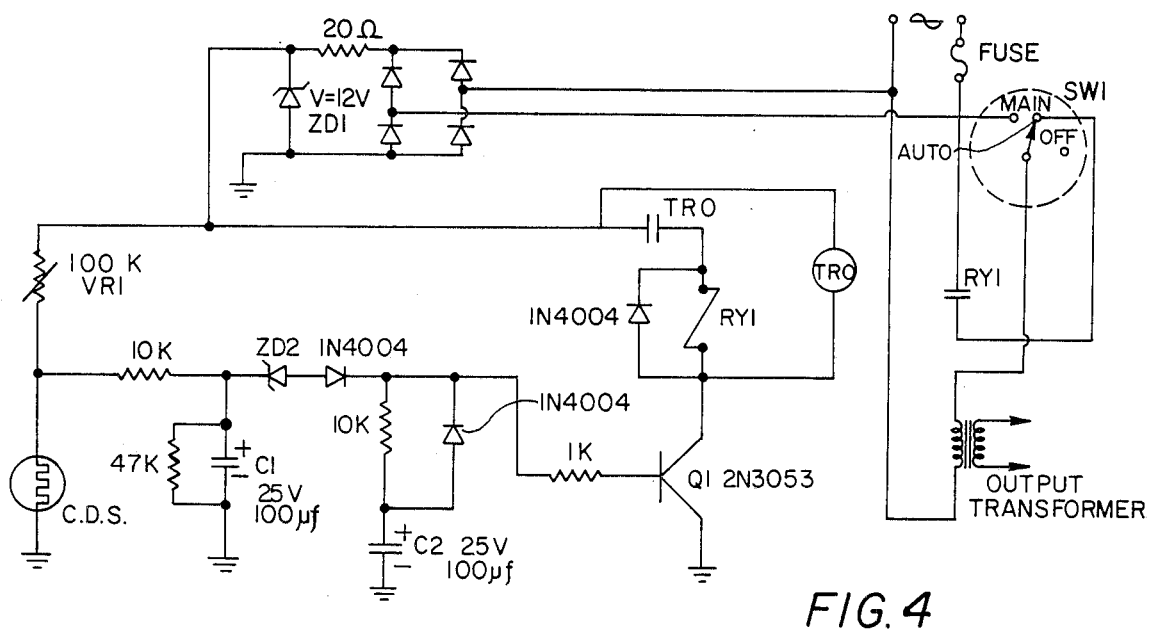
FIG. 4 is a detailed circuit diagram of the practical example of the cut-off circuit of FIG. 3.
Figures 1, 4:
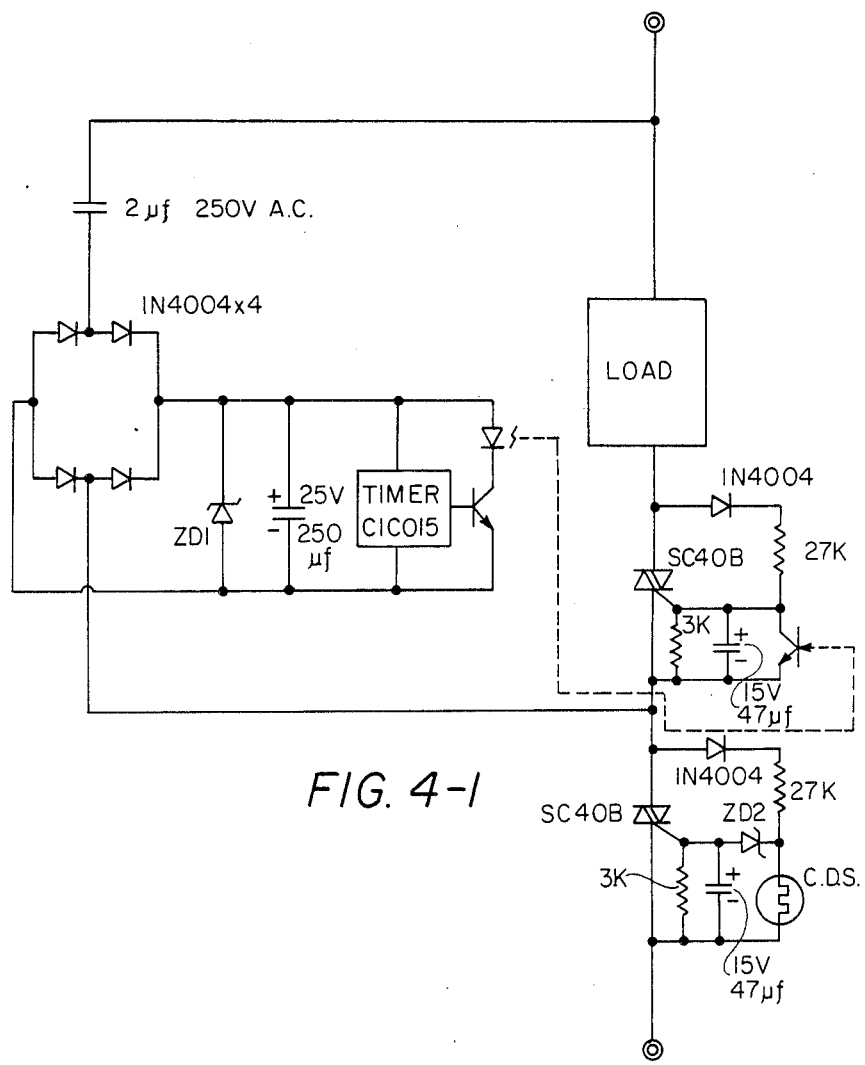

FIG. 4 is a detailed circuit diagram of the practical example shown in FIG. 3, in which D.C. control power supply and photo sensing detection device are provided and illustrated. When the device receives no more sunlight and after this is confirmed by debounce (delay) circuit, it drives the relay RY1 to provide power to the transformer unit connected in series with the normally closed contacts RY1. And after a certain set time delay generated by timer TR0 after response to the sunlight, it then drives RY1 to supply the load transformer unit with power. The values of the circuit components and component identification numerals are shown in FIG. 4, enabling one skilled in the art to construct the circuit without difficulty.

Figure 5:
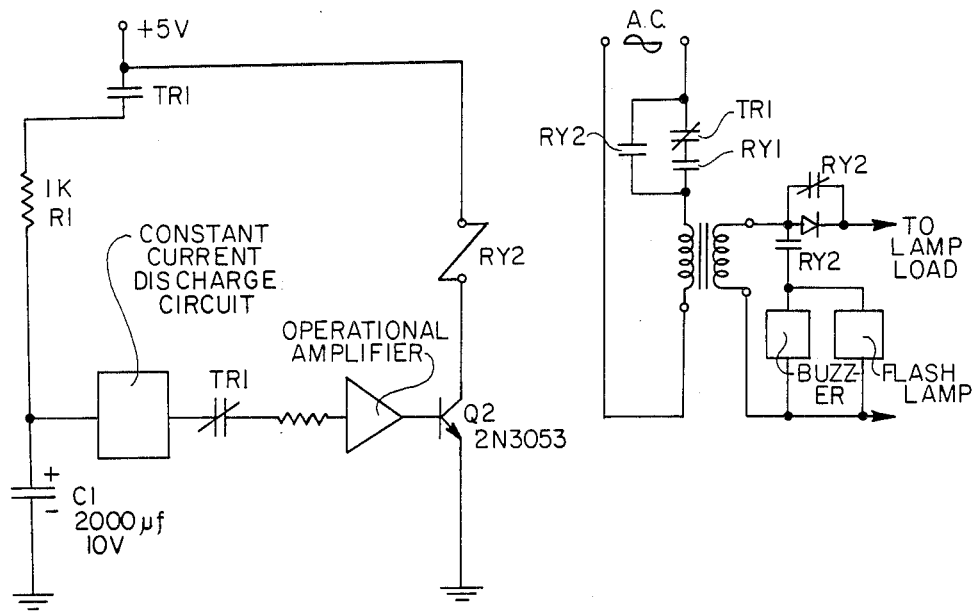
FIG. 5 is a circuit diagram of the practical example of an alarm circuit operatively arranged to provide an alarm before cut-off of power to lamps, which may be used in conjunction with other circuits in accordance with the present invention.

FIG. 4-1 shows a wiring diagram of another embodiment, the circuit component values and identification numerals being set out in the figure thereby enabling one skilled in the art to construct the circuit without difficulty. The embodiment may also have an alarm circuit which can produce expected sounds or light signals (such as flashing or variation) before the control circuit cuts off the power to the lighting apparatus set or sets, in order to remind people on the premises to leave the site. A practical example is shown in FIG. 5. When TR1 closes, D.C. source charges the storage capacitor CP through the constant contact point of TR1 and when the preset time is reached, it makes the power drive transistor Q2 conduct which, in turn, makes relay RY2 turn ON, while the normally closed contacts of RY2 and TR1 are connected in parallel with the control point of the transformer unit, so the transformer output makes the light of the lighting apparatus set become dim or flashing, or drives a sound alarm device to produce given sounds. By means of the discharge of the aforesaid capacitor, it can also make the output voltage gradually drop, thus making the light of lighting apparatus set gradually become dim until the capacitor CP completely discharges and then it cuts off the power to the transformer. This alarm device provides the people in the area with a warning time interval and reminds them to rapidly leave the site.

Figures 6, 7:
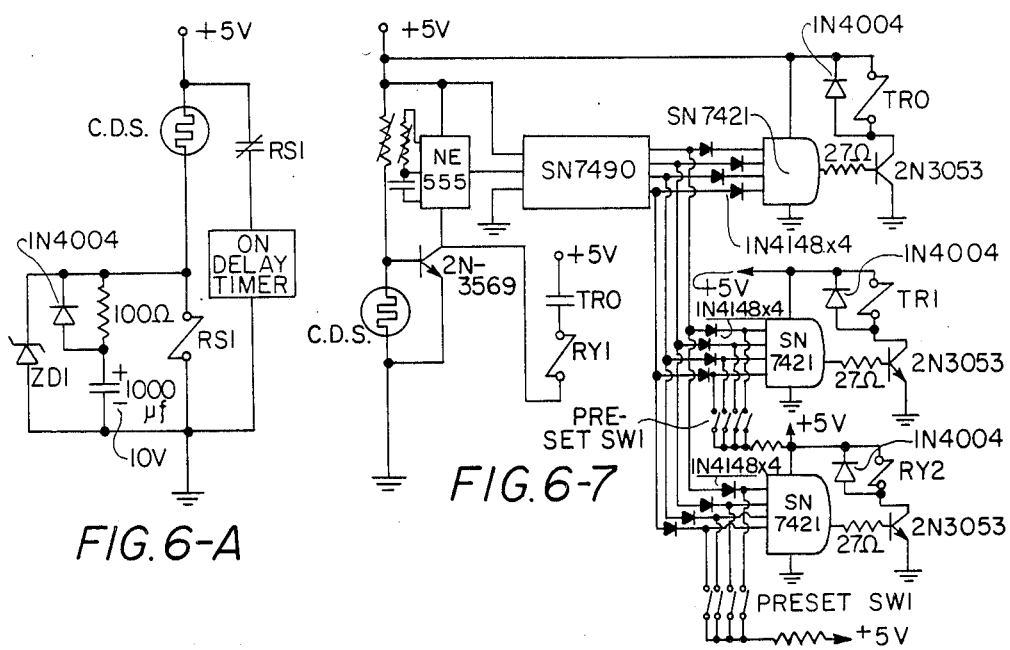
Figure 7:
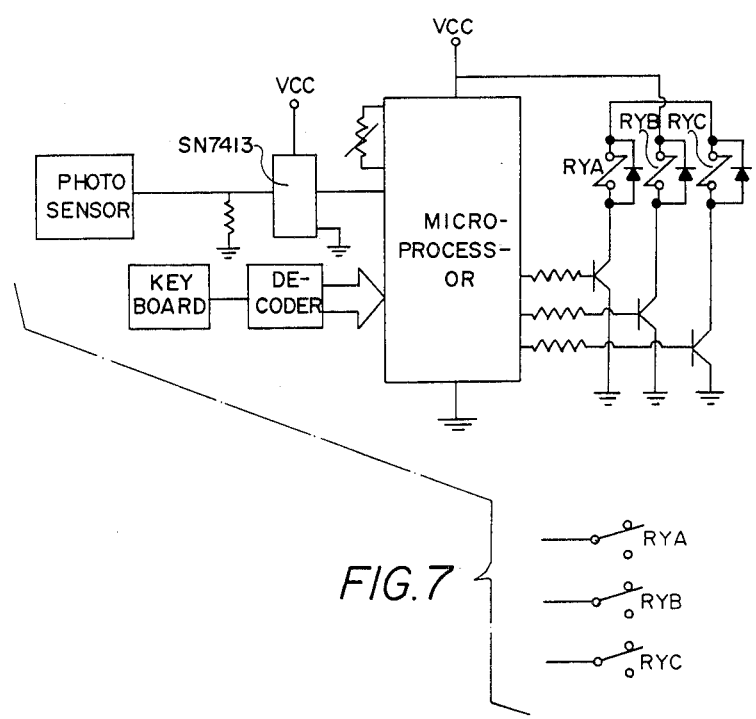
FIG. 7 is a practical example of a photosensing timing circuit which includes a microcomputer in accordance with the present invention.
Figure 8:
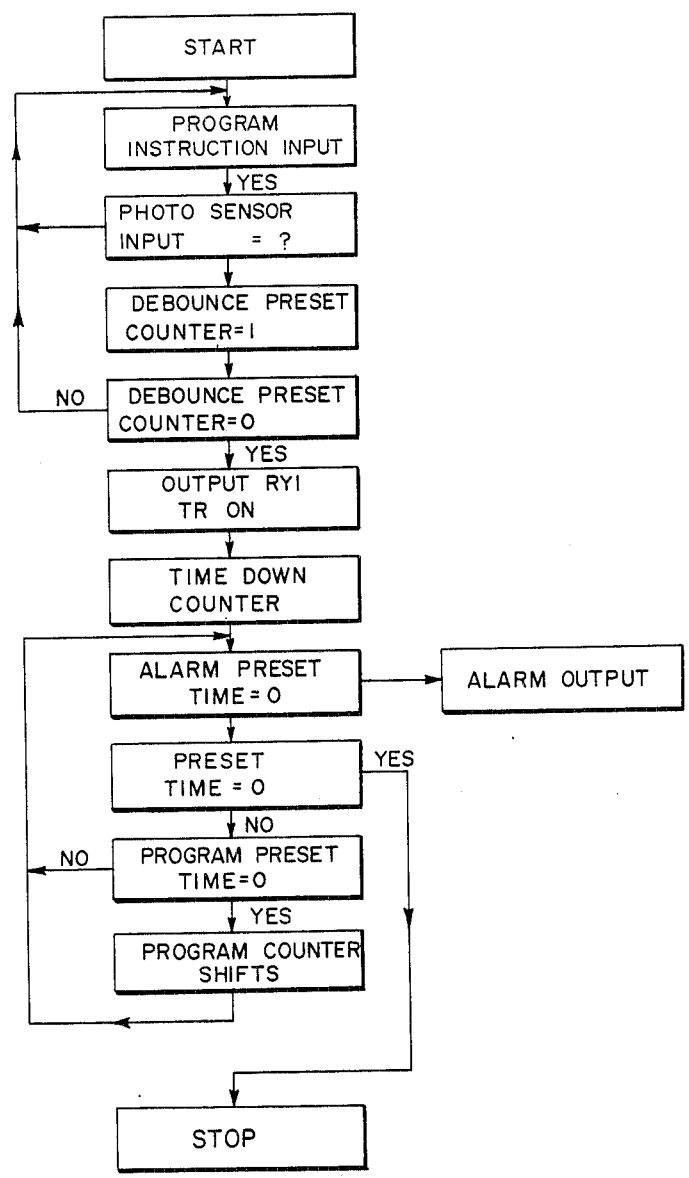
FIG. 8 is a flow chart of the operation of a practical example of a photosensing timing circuit which includes a microcomputer in accordance with the present invention.
Figure 9:
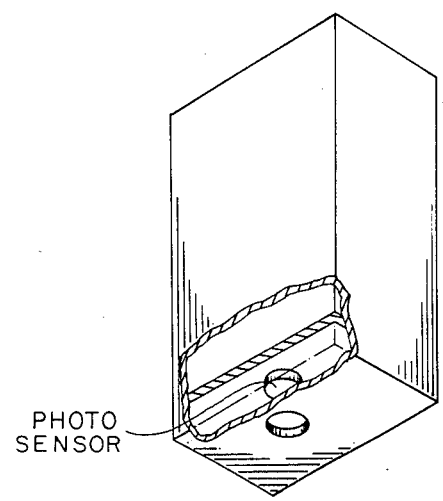
FIG. 9 is a practical example of a light sensor installed inside a protective box which may be used in practicing the present invention.
Figure 10:
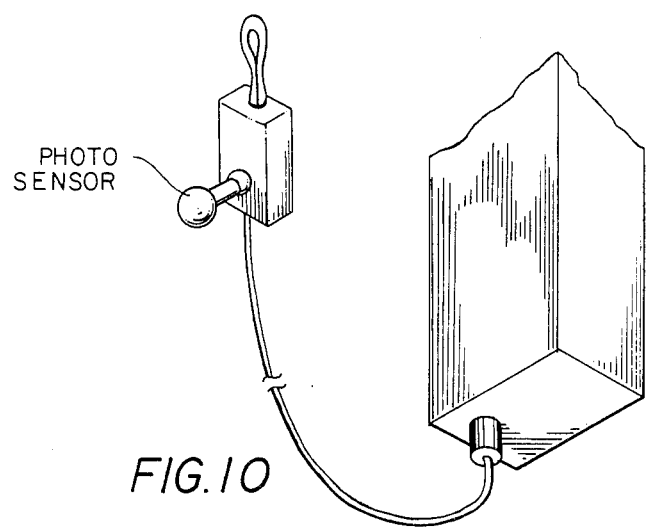
FIG. 10 is a practical example of a light sensor installed outside which may be used in practicing the present invention.
Figures 1, 10:
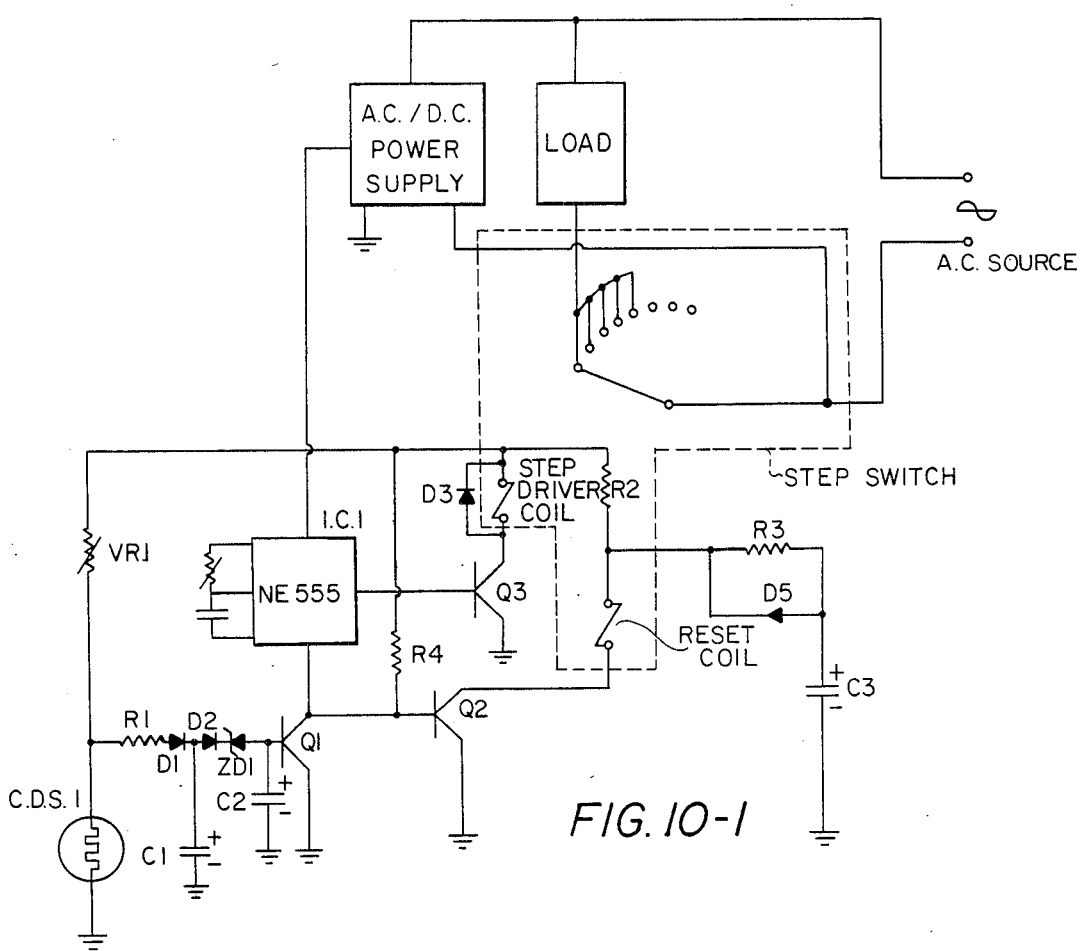
Figures 2, 10:
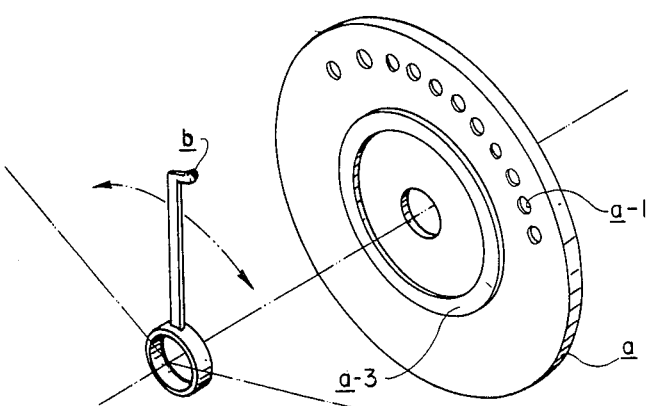
Figures 3, 10:
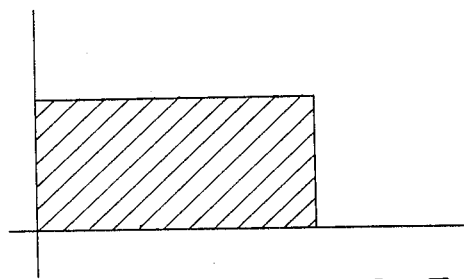
Figures 4, 10:
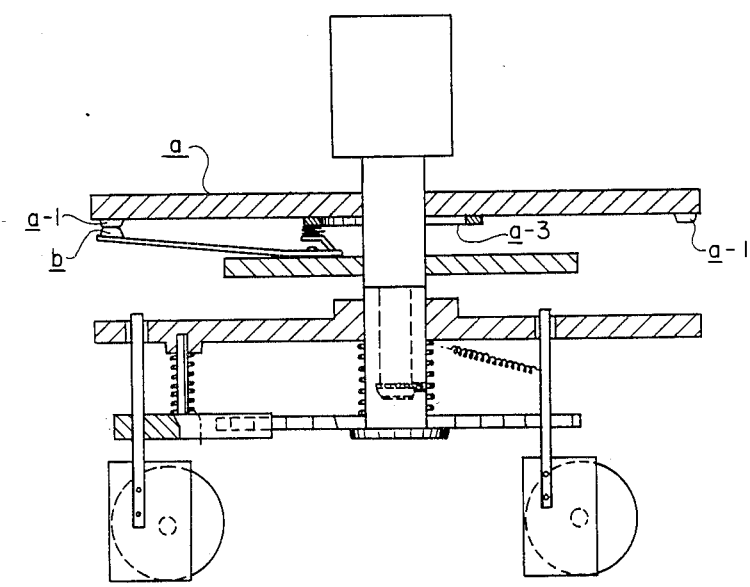
Figures 5, 10:
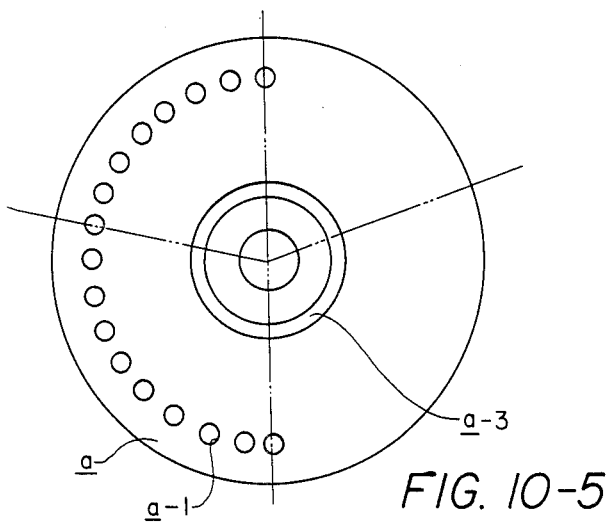
Figures 6, 10:
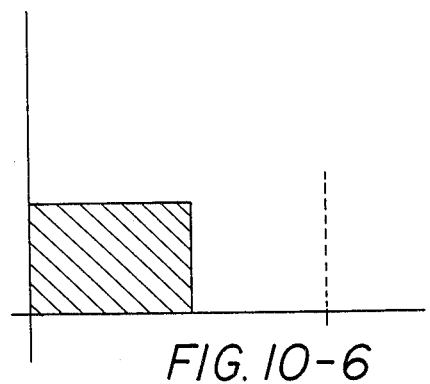
Figures 7, 10:
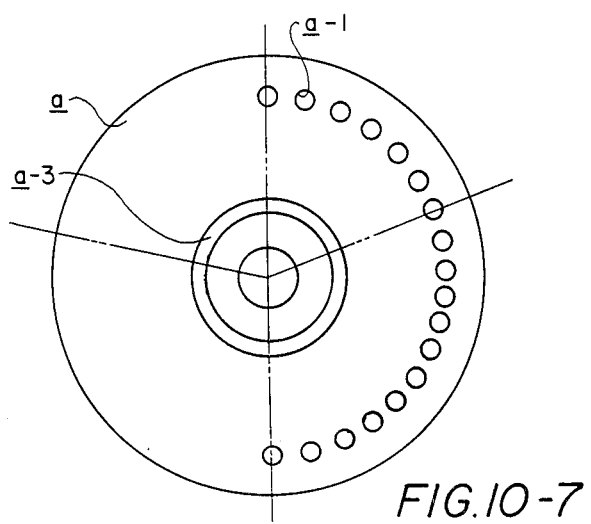
Figures 8, 10:
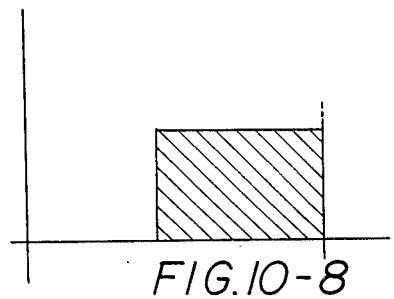
Figures 9, 10:
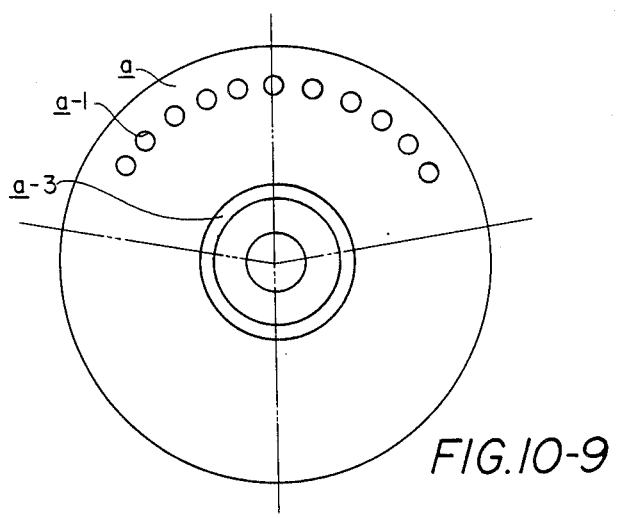
Figure 10:
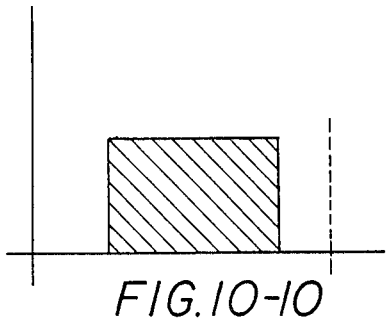

FIGS. 6 A and B show other practical examples of the photosensing timing circuit, identification numerals, and component values being shown in these figures to enable one skilled in the art to construct the circuit without difficulty. FIGS. 7 and 8 show a practical example, which includes a microcomputer. In addition, the sensor used in the above design can be in interior installation or exterior installation type. As shown in FIG. 9, the sensor is installed inside a protective box, and on the protective box, an aperature is provided to allow ambient light to reach this sensor. FIG. 10 shows the practical example of the sensor installed externally, and the sensor is connected to the timing switch circuit, via a cord and receptacle, and is installed with connection lines to a place outside the room or other area. This sensor can, by means of the socket seat structure with a univeral joint connection, or by the attraction connection of a permanent magnet, be set on a photosensing timing switch box or at an outdoor place to make direction adjustments and expedite its ambient light sensing characteristic. In addition to being a conventional electromechanical timer driven by a stepping motor, the aforesaid photocell starting type of electromechanical timer may also be a photo sensitive ON-OFF means that may be provided with a conductive cycle electromechanical type of step switch, of which the embodiment is described in detail, with reference to FIG. 10-1. FIG. 10-1 shows the schematic diagram of said photosensitive ON-OFF circuit that can be provided with a conductive cycle electro-mechanical type of step switch. In the circuit, VR1 and CdS1 are connected in series and are used for adjusting the sensing point. When the CdS1 not being exposed to the light, the voltage across point A will rise, and the current will, via D1 and R1, be charged into C1. Upon the voltage across C1 rising, C2 will be charged, via D1 and ZD1, causing transistor Q1 to become conductive for triggering and driving pulse circuit of time-adjusting or the fixed time-cycle. Upon IC1 being triggered, a cycle pulse will be generated to drive transistor Q2 so as to energize the step coil of the step switch for driving the step contact points of the step switch. Upon the contact points of the step switch being accumulated to an operation point, an "ON" or "OFF" function will be generated. Upon the step switch reaching a locking point and being retained, the switch will not step further forward. The D.C. power supply will, via R2 and R3, charge C3. When CdS1 is exposed to the light, transistor Q3 becomes conductive to cause C3 to discharge for energizing the reset coil of the step switch so as to have the step switch restored to its original position. The power for the photosensitive circuit and the time-adjusting or fixed time-cycle driving pulse circuit is furnished by a rectifier which converts A.C. into D.C. the step contact points are used for switching ON/OFF of the lighting apparatus set or sets (load). The function of the step switch is illustrated in FIG. 10-2 and 10-3.

The aforesaid step switch not only can be made by using a general non-continuous rotating step switch (e.g. the product series of PAS of Guardian Electric Co., U.S.A.), but also may be designed as a single stage or multi-stage step switch, of which the structure is shown in FIG. 10-4, and it comprises a rotary setting disk a made of an insulating material; on this disk a, one or more than one row of contact point sets a-1, or one or more than one row of conductive strips a-2 at a selected angle range and corresponding to said step contact points b may be provided. The feature of this configuration is that the corresponding position with said contact points may be set and adjusted at a given skiding angular displacement. By means of a selected conductive angle, the following functions may be generated:

(1) By means of adjusting the setting disk a contrary to the moving direction of the step switch contact point b, a power cut-off operation to the load may be obtained during the last step moving stage of said step switch along the contact points b as shown in FIGS. 10-5 and 10-6.

(2) By means of adjusting the setting disk a similar to the moving direction of the step switch contact point b, a power cut-off operation to the load may be obtained at the early step moving stage of the step switch along the contact points b as shown in FIGS. 10-7 and 10-8.

(3) The angles designed of the contact point a-1 or of the conductive strip a-2 may be smaller than the moving angle of the step switch contact points b; a given step stage of the step switch contact points b may be selected as a conductive stage as shown in FIGS. 10-9 and 10-10.

The aforesaid setting disk a may be a two-set or more than two-set type being rotated co-axially. The contact points coupled of every set may be connected in parallel so as to have their overlapped resultant angle determine the conductive setting range, and it may also be adjusted together with the positions of the step contact points as shown in FIGS. 10-11 thru 10-13.

The movable step switch may also be designed as a multi-setting function structure; e.g., the setting disk a may be provided on one side with two rows or more than two rows of contact points a-1 or conductive strips a-2, or it may be provided on both sides with one row or more than one row of contact points a-1 or conductive strip a-2; in addition, it may be furnished with a slip ring a-3 corresponding to every set of the step switch contact points b so as to make corresponding setting adjustment. The aforesaid single or multi-setting type of step switch may also be made with the fixed contact point sets of a conventional step switch to form a dual-end contact point type as shown in FIG. 10-14, of which one end is coupled to the step contact point, and the other end may be coupled to one or more than one set of rotary contact point sets which rotate co-axially with said contact points either being driven manually or driven with other means. The contact point set may also be coupled to a slip conductive strip for output purpose.

Figures 10, 11, 12, 13, 14:
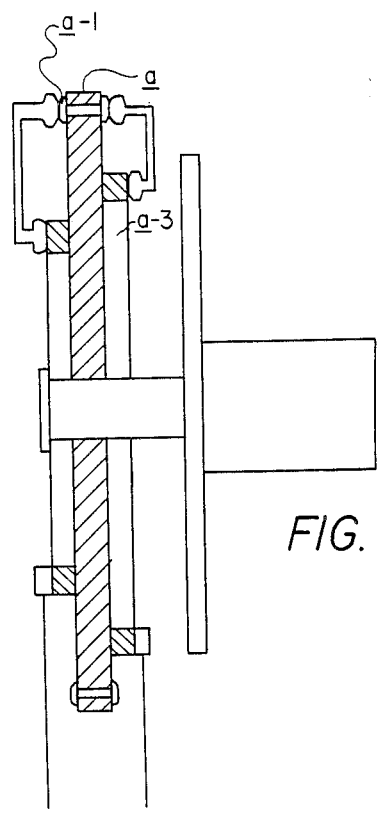
Figures 10, 11, 12, 13, 14, 15:
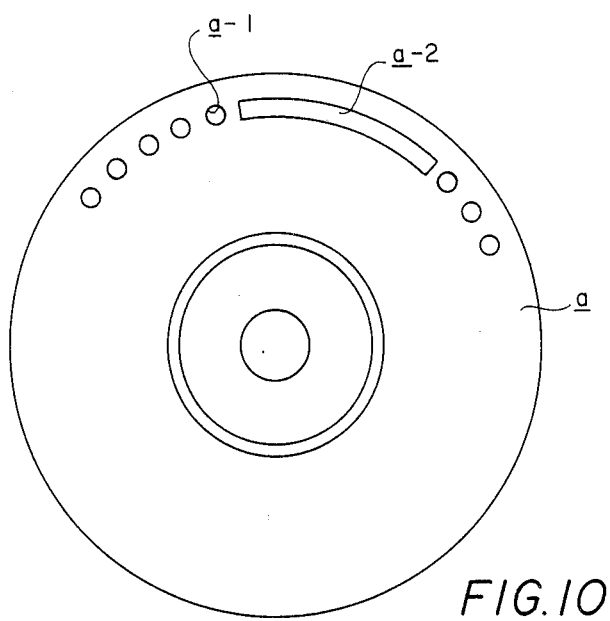
Figure 11:
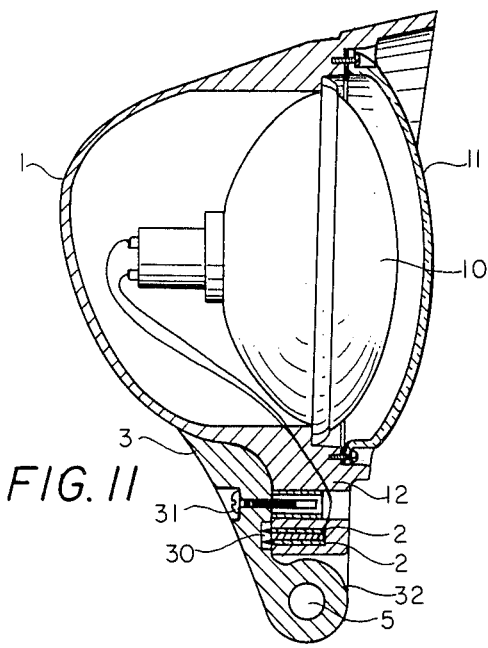
Figure 12:
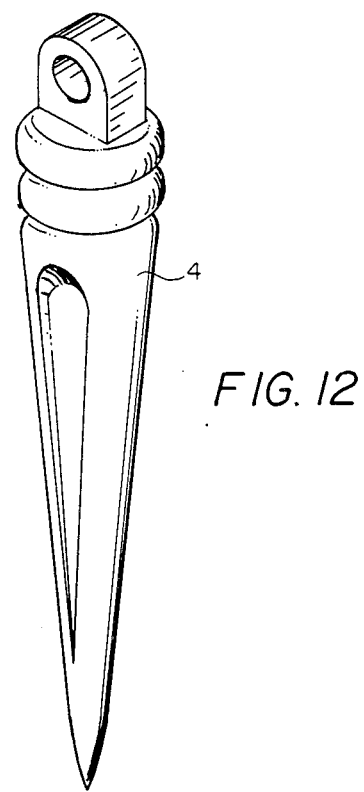

In the above-mentioned various types of setting step switch arrangements, the rotary setting disk a may be formed in a cylinder shape or other shape which may facilitate the function desired, and the conductive strip a-2 and the contact points a-1 may also be used and combined, as shown in FIGS. 10-15 so as to provide necessary control functions. As shown in FIGS. 11, 12, and 13, the lighting apparatus structure of the lighting apparatus set includes a lamp shell seat 1, a power linkup insertion plate 2, a cord-holding down seat 3 and an anchoring insertion rod 4 and a lamp 10 and a lamp 11 housing. The lighting apparatus is to accept control from the timing control devices mentioned above. Its feature lies in that on the backside of foot seat 122 are cut in a criss-cross way in lower and upper positions, and taken a proper position in each channel 122, a slot is cut to directly lead to the lamp shell seat. This slot is used in such a way as when power linkup insertion plate 2, is inserted in, the cord can extend through the slot to the two poles to the lamp 10 in the lamp shell seat. The abovementioned cord-holding down seat 3 can be bolted to the lower side of foot seat 12 in conjunction with coupling bolt 5 for foot seat 12 and insertion rod 4. On the edge surface of the tip to power linkup insertion plate 2 opposite to cord-holding down seat 3, a rectangular cut-out 30 is provided in a shape corresponding to the cross section of cord 6. Besides, this cord-holding down seat 3 can be rotated with bolting rod 4 as its center or be bolted by positioning screw 31 to the rear side of foot seat 12. This design allows and end of power supply cord 6 to be placed in the rectangular cut-out 30 of cord-holding down seat 3, thus positioning the copper wires of various cords in a crossway upper and lower lineup. The cord-holding down seat 3 is fixed by positioning screw 31 allowing contact with the copper wires of the corresponding cords 6. The cord of the power linkup insertion plate 2 extends to lamp shell seat 1, providing power to lamp 10.

As shown in FIGS. 13 and 14, the rotatable cord-holding down seat 3 may have two positioning ring plates 32 on its bottom, allowing bolting rod 5 to pass through and be positioned under foot seat 12, or it may be in a shape of changeable cord-holding down seat 3 having ring plate 32 with a cut-out. On the upper part of this ring plate 32, a rectangular undercut 30 and a screw hole is provided to allow positioning screw 31 to penetrate through, thus tightly screwing the positioning screw on the rear side of foot seat 12. On the rear side of this foot seat 12, two flat channels 122 are provided and can be made in the same shape and depth as the shape and length of insertion plate 2. These two channels 122 can be in an upper and lower linear lineup or upper and lower or left and right criss-cross position lineup.

As shown in FIGS. 15, 16, 17, and 18, the power linkup structure composed by cord-holding down seat 3 and power linkup insertion plate 2 in foot seat 12 can be in a form of cord-holding down seat 3 with a crossway undercut 30, and the bottom of this crossway under cut 30 may be in a plain form or has a protruding crossway sharp knife 33 in its central part, whereas this sharp tip 33 can be in a height equal to that of the outer edge of cord-holding down seat 3 or even higher than that; the upper and lower sides of sharp ;tip 33 on the bottom of rectangular undercut 30 semi-arc 34 or V-shaped slot 36 can be crosswayly cut to gear to the radius of covered cord 6; ;when the above-said sharp knife 33 in the cord-holding down seat 3 is pressed down in the direction of foot seat 12 and against power cord 6 in the rectangular undercut 30, it can cut off the contact part of the covering rubber layer of the power cord 6 for the two poles; by this, it can totally separate the positions of the two poles and also accept and place various single polar cords in the above-mentioned semi-arc slot 34 or V-shaped slot 35 to facilitate the power linkup insertion plate 2 extended out from foot seat 12, accurately inserting into power cord 6 and contacting the copper wires.

In the above-discussed designs, the structure provides the mutual insertion and connection for power linkup by cord power 6 in the rectangular undercut 30 and the power linkup insertion plate 2 in the corresponding position, but its rectangular undercut 30 and its sharp knife 33, semi-arc slot 34, V-shaped slot 35 are cut on the rear side of foot seat 12 and the power cords in lamp shell seat 1 are pulled out and positioned crossway in rectangular undercut 30 to allowing power linkup insertion plate 2 to extend from cord-holding down seat 3 and be correctly inserted and connected to the power source. Furthermore, in the power linkup a structure, when it can be further in such a matter as the power cords 6 can be placed in its rectangular undercut 30. A screw hole is drilled at the position of the copper wires of the same pole to position the screw with a metal pin 30 on its one end screwing up against the hole. By virtue of the penetration of this metal pin through the power cords as well as the power cords pulled out from lamp shell seat 1, it passes through the copper wires within the two power cords to achieve power linkup.

As for the lighting apparatus constructed in accordance with the present invention, when its power cord or lamp cord is smaller, and when it is impossible to let the two fixed distance power linkup insertion plates 2 simultaneously and respectively insert and contact the copper wires of the two power cords, the auxiliary positioning block 37 can be used to position the power cords in various sizes as shown in FIG. 14. The auxiliary positioning block 37 is in a form similar to that of the rectangular undercut 30 of cord-holding down seat 3 and can be placed in the rectangular undercut 30 and thus be positioned therein. On this positioning block 37, a smaller rectangular undercut 300 is provided, but this rectangular undercut 300 is at an oblique angle to mesh with the two power linkup insertion plates 2 in upper and lower criss-cross position lineup for bridging the distance between the copper wires of the two smaller power cords, thus making the power linkup insertion plates 2 accurately so they can be inserted into and contact the copper wires of the two poles. Additionally, as for the auxiliary positioning block 37, its smaller rectangular under 300 can be also cut with sharp tip 33, semi-arc slot 34 and V-shaped slot 36 as its features.

Figure 19:
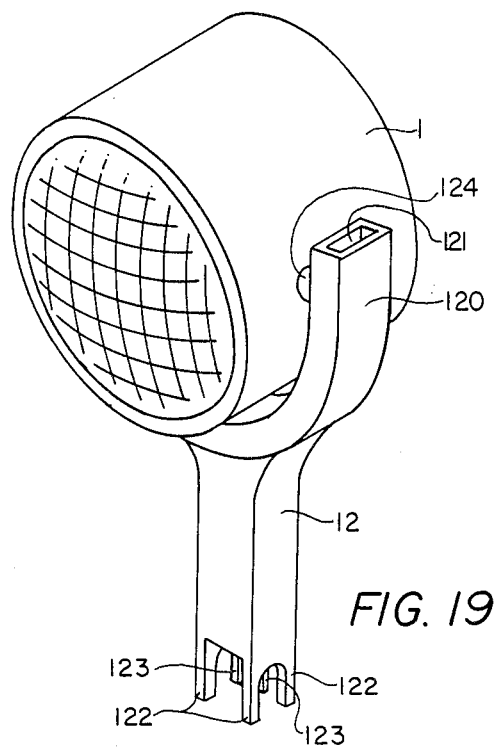
FIG. 19 is a pictorial view of a lighting apparatus set with its light shell seat rotatable about a single axis on its associated foot seat, which may be used in practicing the present invention.
Figure 20:
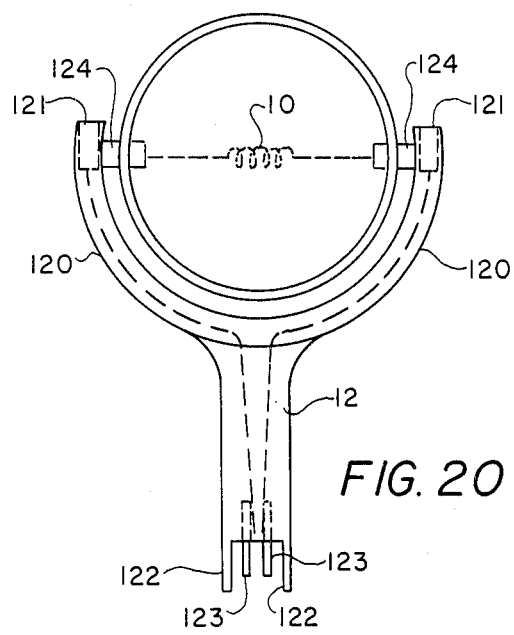
FIG. 20 is a front view of the lighting apparatus set shown in FIG. 19.

The structure of the lighting apparatus which may be used in practicing the present invention as shown in FIGS. 19 and 20, can be in a form of lamp shell seat 1 rotatable in foot seat 12. Its foot seat bends upward in a form of two arc arms 120 with their upper half part in a semi-circular shape; on the top of these arms 120, supports 124 are provided to support lamp shell seat 1, thus making lamp shell seat 1 rotatable along the straight line formed by these two supports 124. On the tops of arc arms 120 of foot seat 12 of this design, two power linkup slots 121 are provided in the downward direction, while on the bottom of seat foot 12, two straddling feet are provided. The width of the space between these two straddling feet if two times that of the arc arms 120; between these two straddling feet 122, two power linkup cords 123 in a form same to that of power linkup channel 121 are provided; these power linkup cords 123 can lead the power into the power linkup channels 121 on the arc arm 120 through foot seat 12 by means of the power cord and then link up the two poles for the filament 10 installed in the lamp shell seat 1 by way of the supports.

Figure 21:
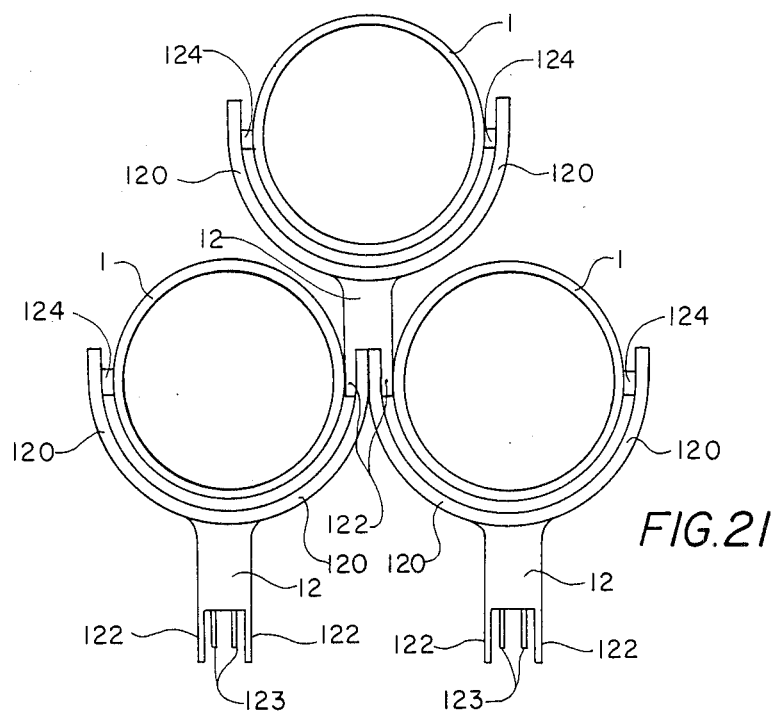
FIG. 21 is a practical example of multiple lighting apparatus sets arranged together, and which can be used in practicing the present invention.

As shown in FIG. 21, the above-described lighting apparatus structure can be further made in a combined power linkup by multiple lighting apparatus sets; the way of its coupling combination is by means of right arc arm 120 of the left lighting apparatus on the lower part to closely connect, back to back, the left arc arm of the right lighting apparatus on the lower part, while the two straddling feet 120 on the bottom of foot seat 122 of another lighting apparatus in the upper and middle part sandwich these two connected arc arms 120. The two lighting apparatuses in the lower part plus the lighting apparatus in the upper and middle part become in integral body. The power source of the upper lighting apparatus is led in by the power linkup rod 123 between the two straddling feet 122 since each of these two power linkup rods 123 is inserted into the power linkup channels 121 on the two arc arms 120, respectively, during coupling and also contacts the respective power source contacts in the power linkup channel 121; thus, the two electric poles linkup to the power source is effected.

Figure 22:
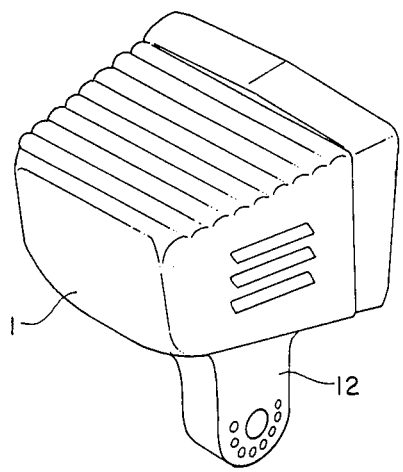
FIG. 22 is an exploded, pictorial view of a coupled rotational structure of a lamp shell seat and an insertion rod, which can be used in practicing the present invention.
Figure 22:
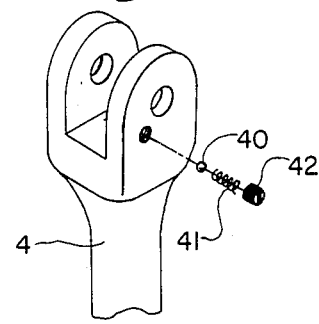

As shown in FIG. 22, the coupling rotational action of the above-mentioned lamp shell seat and insertion rod may be realized using the drilled hole on the coupling end of insertion rod 4 or foot seat 12. The positioning steel balls 40 and spring 40 are put into this hole. Behind the spring, a positioning screw 42 is screwed in to secure these members in place in the hole, thus making possible the positioning steel ball 40 forced into the semi-arc slot provided on the perimeter of the corresponding member in order to stabilize the position of lamp shell seat 1 after this lamp shell seat is rotated.

Figure 23:
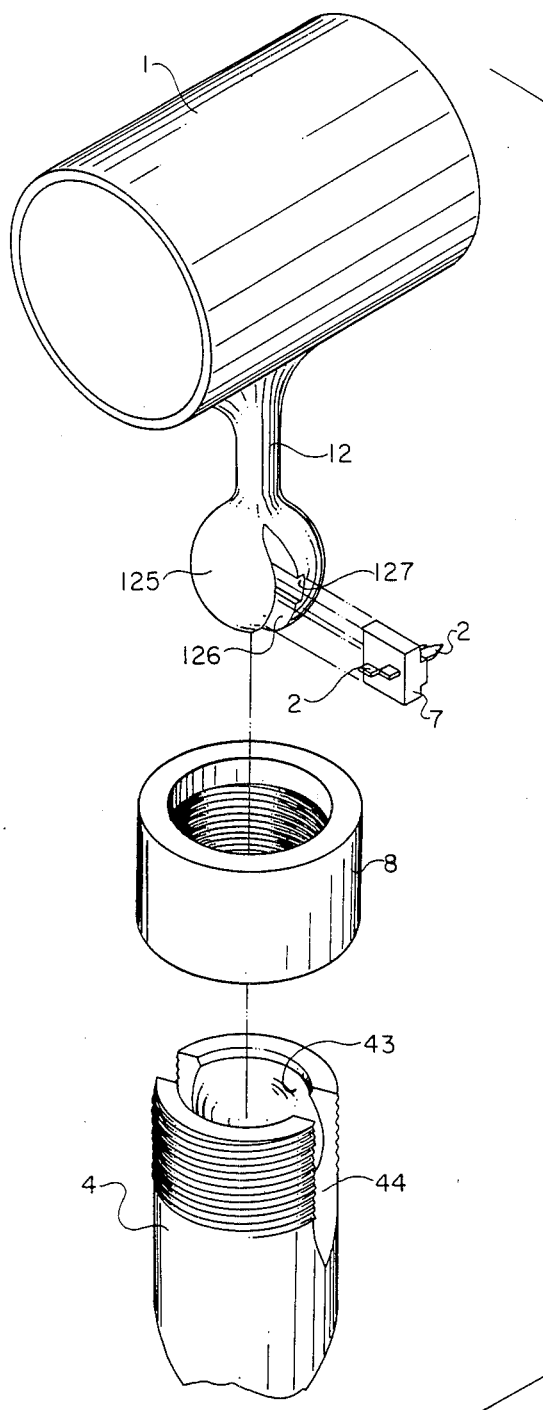
FIG. 23 is an exploded, pictorial view of a lighting apparatus set with its lamp shell seat rotatable about an axis in its foot seat, which may be used in practicing the present invention.
Figure 24:
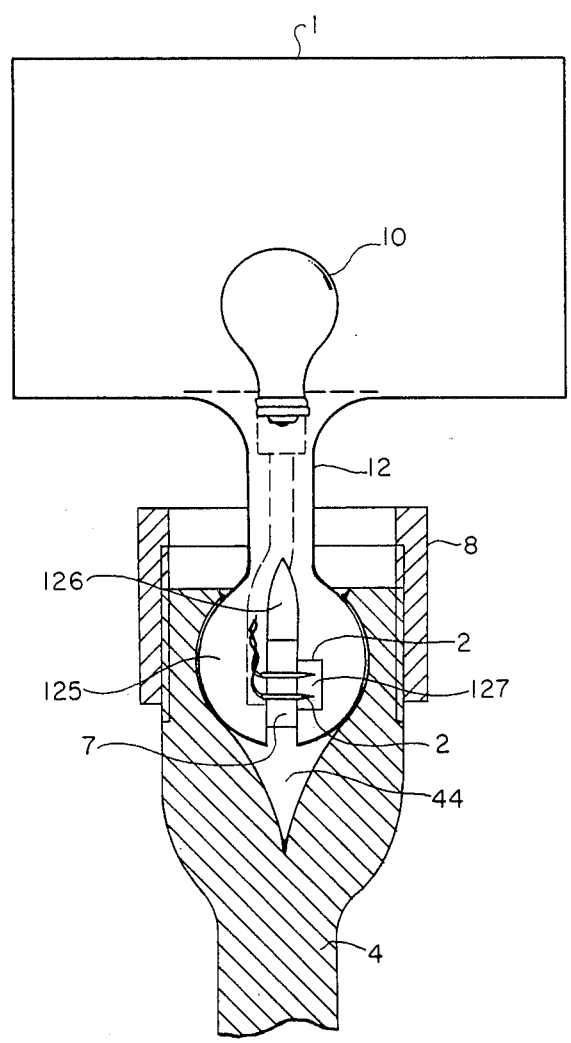
FIG. 24 is a front view, partially in section, of a lighting apparatus set with its lamp shell seat universally rotatable in its foot seat, which may be used in practicing the present invention.

As illustrated in FIGS. 23 and 24, lamp shell seat 1 in accordance with the present invention can be made in such a form as the end of its foot seat 12 in a ball body 125, a length way channel 126 being provided on the body. On one side of this channel, a rectangular slot 127 is provided depending on the actual needs, this rectangular slot 127 allows the front flange of base seat 7 of positioning power linkup plates 7 to be inserted by whole base seat 7. The power linkup insertion plates 2 extending from the front flange of base seat 7 can, by the above-mentioned ways, be connected with power cord 6 to conduct the power to lamp shell seat 1 through the welded cord on the end of power linkup insertion plated 2 as its special design. The rotational structure of the lamp shell seat 1 can be a ball body 125 on the end of foot seat 12, so it rotates in ball slot 63 on the upper end of insertion rod 4. Threads are provided on the surface ring of the outer ring on the upper end of this insertion rod 4, while in its inner part, the ball channel 43 has a radius which is the same as that of the ball body 135 of foot seat 12. A cut-off 44 is also provided therein; when ball body 125 on the end of foot seat 12 is placed into ball channel 43, a compression ring 8 with inner rings in a conic form is rotated in to feed it and to force the upper end part of insertion rod 4. This cut-off gradually reduces in size to practically stabilize ball body 125 which, in turn, indirectly stabilizes lamp shell seat 1.

Figure 25:
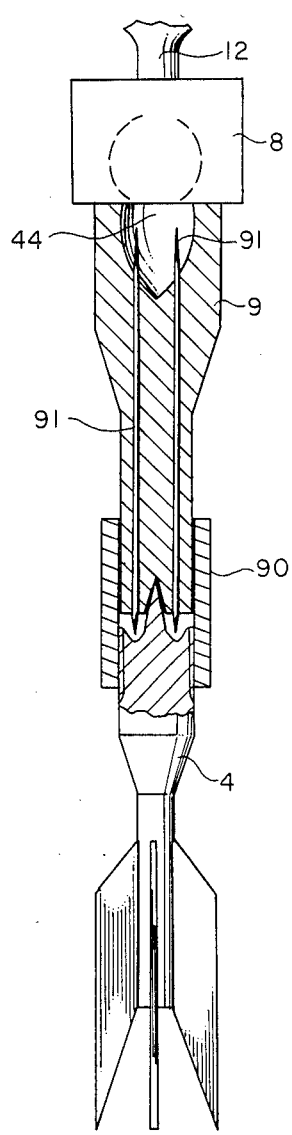
FIG. 25 is a view of a lighting apparatus composed of multiple power linkup rods and with its lamp shell seat universally rotatable, which can be used in practicing the present invention.

As shown in FIG. 25, the above-discussed lighting apparatus can be further expanded by one or more sections of power linkup rods 9 and joint socket rings 90 to couple and connect foot seat 12 and insertion rod 4 in order to adjust the height of the lighting apparatus. The lighting apparatus can be installed with a power linkup rod 9, and the top of this power linkup rod 9 has the aforesaid ball channel 43 and compression ring 8. A power linkup needle 91 extends upward from the bottom of power linkup rod 9 which is directly connected to the power cord pulled out downward from lamp shell seat 1. When the power linkup needle 91 is coupled with the power linkup rod 9 and another power linkup rod 9 or insertion rod 4 by joint socket ring 90, it is inserted and connected to the bipolar power cords 6 on both sides of the sharp knife on the top of another power linkup rod 9 or insertion rod 4.

Figure 26:
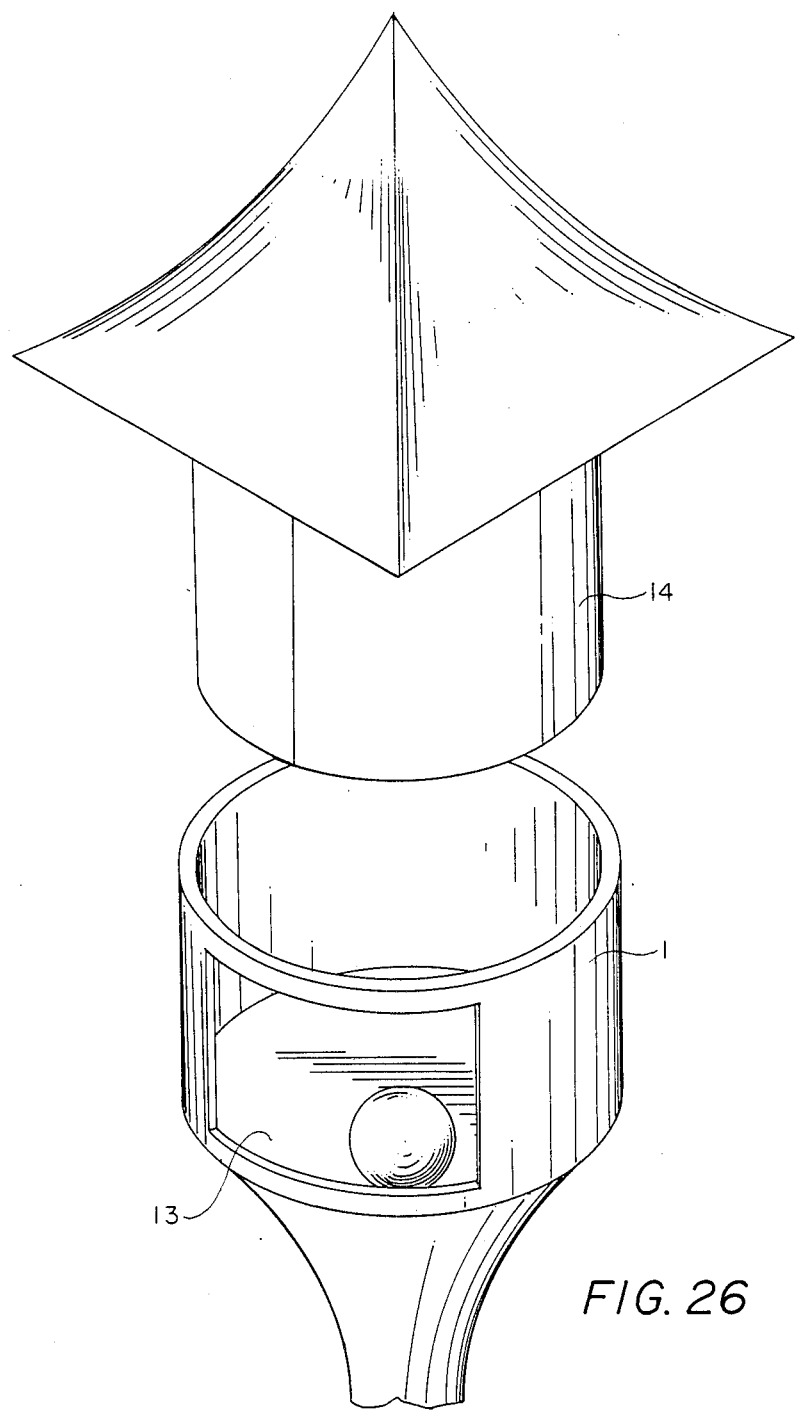
FIG. 26 is an exploded view of a lighting apparatus set with a cylindrical lamp shell seat having variable light colors during rotation, which can be used in practicing the present invention.

Besides, lamp shell seat 1 in practicing the present invention can be in a vertical, cylindrical or elliptic form as shown in FIG. 26, and on its ring rim surface, one or more windows 12 in an appropriate shape are provided. An opening on the top of cylindrical lamp shell seat 1 can accommodate a color ring 14 in a form corresponding to that of the cylindrical lamp shell seat 1. This color ring is made of transparent materials and has various colors in different circular angles or equivalent scopes, the top of this color ring 14 being placed on cylindrical lamp shell seat 1. The hat (bonnet) has an outside surface and can be manually rotated or driven, thus making the light passing through the windows 13 changeable in color. The driving means for making such color changes of the light, as mentioned above, can be the power used in cylindrical lamp shell seat 1 to drive a motor and then, via a conventional mechanical joint action structure, such as camming unit, gear train, and belt-pulley system to drive color ring 14 in slow rotation at a constant speed.

Figure 27:
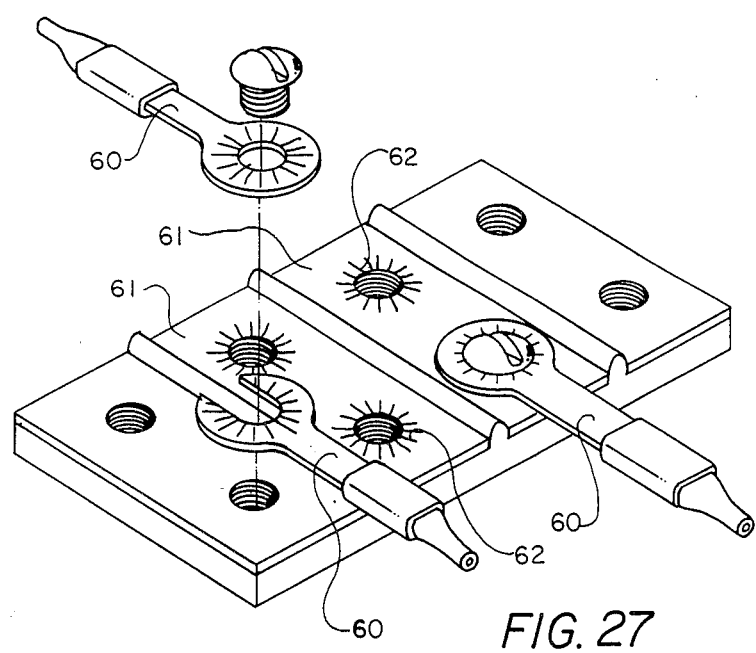
FIG. 27 is a pictorial view of a special structure composed of terminal straps and terminal blocks, which can be used in practicing the present invention.

A type of terminals 60 or terminal blocks 61 as shown in FIG. 27 can be used to the above-described lighting apparatus set or for other power distribution usage. The terminal portion for connecting the power supply can be in a form of rings or open terminals 60 with radial pressed and shaped strips in a proper density on a single face or both faces of these terminals. The terminal blocks 61 are also provided with shaped strips 62 in the same form. When the securing screws and screwed up tightly to fix terminals 60 and terminal block 61, the frictional effect of the shaped stripes on these terminals and terminal blocks is used to prevent terminals 60 from making rotational displacements.

Figure 28:
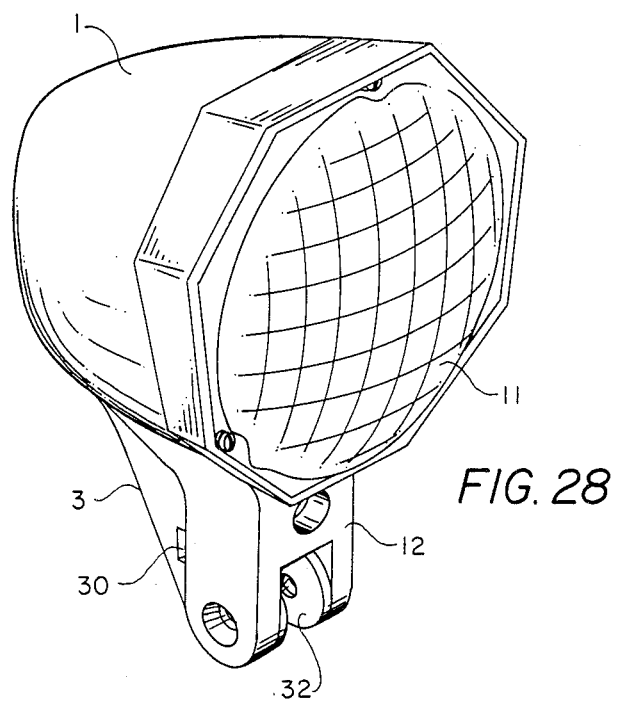
FIG. 28 is a pictorial view of an octagonal lamp housing of a lighting apparatus set, which can be used in practicing the present invention.
Figure 29:
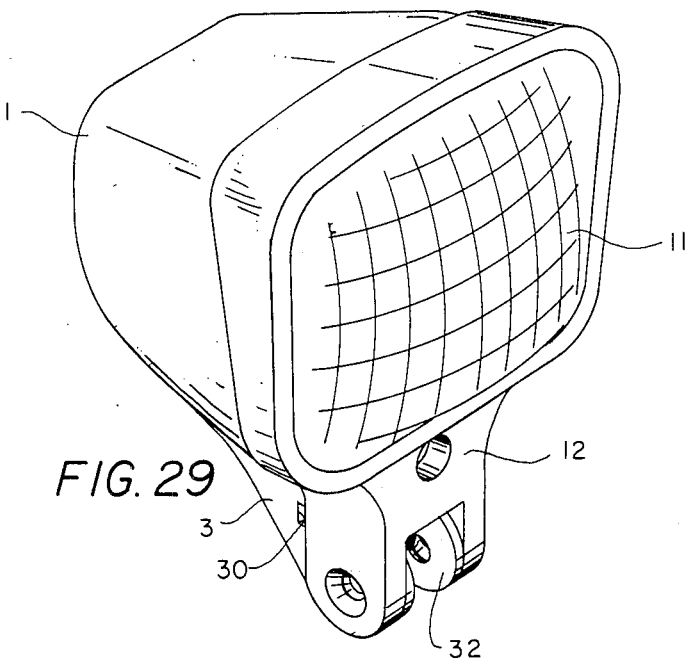
FIG. 29 is a pictorial view of a rectangular lamp housing of a lighting apparatus set, which can be used in practicing the present invention.
Figure 3:
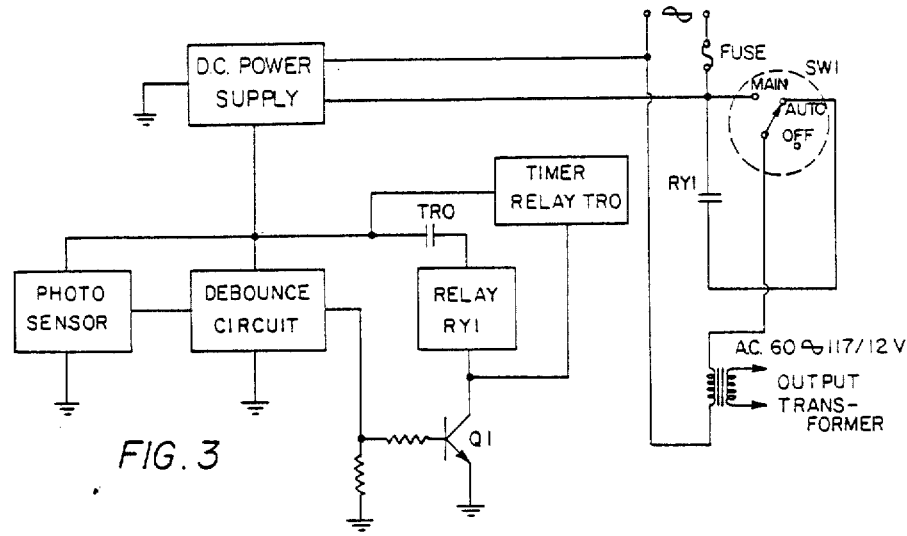
Figure 4:
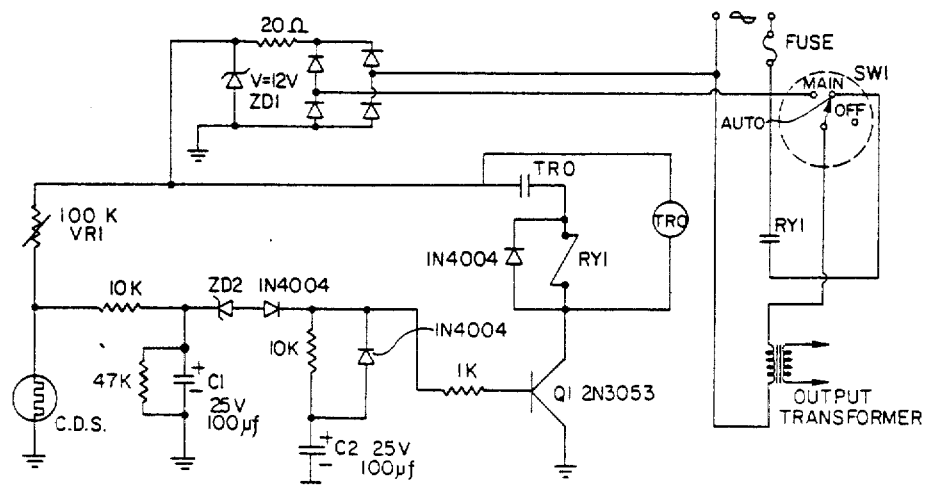
Figures 1, 4:
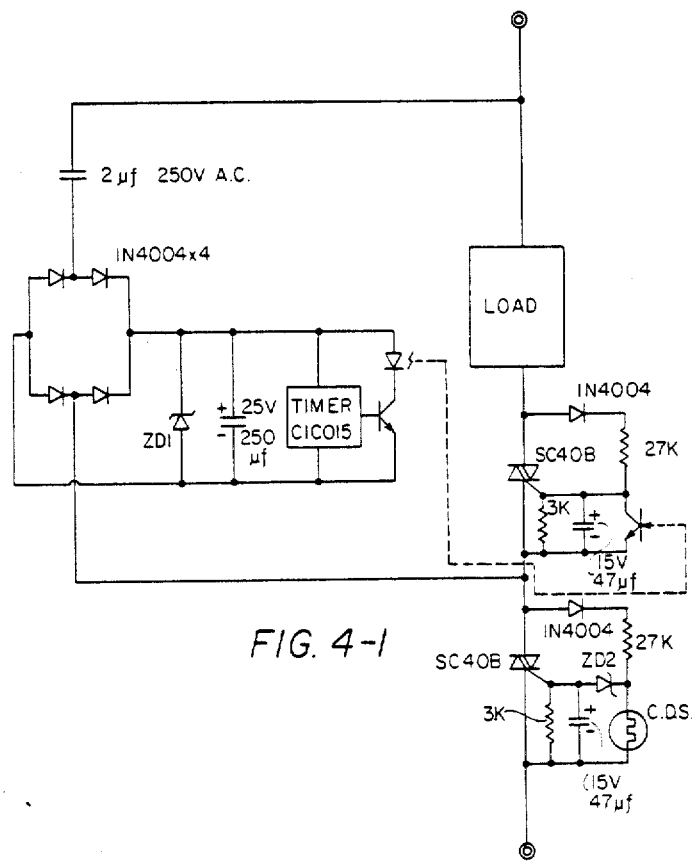

Regards the above-said lighting apparatus, its lamp head and lamp housing portions can be in a rectangular, square, elliptic, circular, cylindrical or any other geometric form such as shown in FIGS. 28 and 29 and can also have a cylindrical single or double-way lamp head with a lamp shell in a single side or be in a double side style with a lamp shell in two sides.

I claim:

1. In a controlled lighting system having at least one lighting apparatus set for illuminating a given area, means for supplying power to the at least one lighting apparatus set and control circuit means for controllably coupling the means for supplying power to said at least one lighting apparatus set, wherein said control circuit means includes light sensing means responsive to ambient light for developing a control signal whenever intensity of the ambient light reaches a given level and remains at that level or becomes less, delay circuit means coupled to said light sensing means and responsive to the control signal therefrom for developing a delayed control signal indicating that the intensity of ambient light has remained at or below said given level for a predetermined interval, making the system nonresponsive to short term ambient light intensity variations, power switching means coupled to said delay circuit means and responsive to the delayed control signal therefrom for switching ON power from said means for supplying power to said at least one lighting apparatus set, timing circuit means coupled to said delay circuit means and responsive to the delayed control signal therefrom for providing a predetermined time interval and producing a further control signal upon expiration of the predetermined interval, said power switching means being coupled to said timing circuit means and responsive to the further control signal for switching OFF power from said means for supplying power to said at least one lighting apparatus set upon expiration of the predetermined interval and for switching OFF power to said at least one lighting apparatus set upon disappearance of the delayed control signal in response to said light sensing means determining that intensity of the ambient light has exceeded the given level and said delay circuit determining that the intensity has been exceeded for the given time interval, an alarm circuit means responsive to an output from said timing circuit means for providing an alarm in advance of expiration of the predetermined time interval, a cord having a receptacle on an end thereof, said sensing means including a light responsive component carried by said receptacle, wherein said delay circuit means comprises a debounce circuit, and wherein said power switching means comprise relay means.

2. In a controlled lighting system having at least one lighting apparatus set for illuminating a given area, means for supplying power to the at least one lighting apparatus set and control circuit means for controllably coupling the means for supplying power to said at least one lighting apparatus set, wherein said control circuit means includes light sensing means responsive to ambient light for developing a control signal whenever intensity of the ambient light reaches a given level and remains at that level or becomes less, delay circuit means coupled to said light sensing means and responsive to the control signal therefrom for developing a delayed control signal indicating that the intensity of ambient light has remained at or below said given level for a predetermined interval, making the system nonresponsive to short term ambient light intensity variations, power switching means coupled to said delay circuit means and responsive to the delayed control signal therefrom for switching ON power from said means for supplying power to said at least one lighting apparatus set, timing circuit means coupled to said delay circuit means and responsive to the delayed control signal therefrom for providing a predetermined time interval and producing a further control signal upon expiration of the predetermined interval, said power switching means being coupled to said timing circuit means and responsive to the further control signal for switching OFF power from said means for supplying power to said at least one lighting apparatus set upon expiration of the predetermined interval and for switching OFF power to said at least one lighting apparatus set upon disappearance of the delayed control signal in response to said light sensing means determining that intensity of the ambient light has exceeded the given level and said delay circuit determining that the intensity has been exceeded for the given time interval, an alarm circuit means responsive to an output from said timing circuit means for providing an alarm in advance of expiration of the predetermined time interval, and a protective housing, said sensing means being positioned within said housing, at least one aperture being provided in said housing to introduce ambient light onto said sensing means, wherein said delay circuit means comprises a debounce circuit, and wherein said power switching means comprise relay means.

* * * * *

UNITED STATES PATENT AND TRADEMARK OFFICE
CERTIFICATE OF CORRECTION

PATENT NO. : 4,645,980     Page 1 of 3
DATED     : February 24, 1987
INVENTOR(S) : Tai-Her Yang It is certified that error appears in the above-identified patent and that said Letters Patent are hereby corrected as shown below:

In the Drawings:
Add Figures 3 and 4 on sheets 2 and 3.
Add Figure 4-1 on sheet 3 of 23.
In column 7, line 68 of the Patent, delete "and" and substitute -- the -- therefor.

In column 11, line 14 of the Patent, delete "and" and substitute -- are -- therefor.

Signed and Sealed this

Twenty-ninth Day of November, 1988

Attest:

DONALD J. QUIGG

*Attesting Officer*     *Commissioner of Patents and Trademarks*